(No Model.)

C. L. ROGERS & G. W. WOLF.
MILK BUCKET.

No. 287,726. Patented Oct. 30, 1883.

WITNESSES:
Fred. G. Dieterich.
Maurice Delmar.

C. Lyon Rogers,
George W. Wolf.
INVENTORS.

By Louis Bagger & Co.
ATTORNEYS.

UNITED STATES PATENT OFFICE.

CHARLES LYON ROGERS AND GEORGE W. WOLF, OF BALTIMORE, MD.

MILK-BUCKET.

SPECIFICATION forming part of Letters Patent No. 287,726, dated October 30, 1883.

Application filed February 10, 1883. (No model.)

*To all whom it may concern:*

Be it known that we, CHARLES LYON ROGERS and GEORGE W. WOLF, both of Baltimore, in the county of Baltimore and State of Maryland, have invented certain new and useful Improvements in Milk-Buckets; and we do hereby declare that the following is a full, clear, and exact description of the invention, which will enable others skilled in the art to which it appertains to make and use the same, reference being had to the accompanying drawings, which form a part of this specification, and in which—

Figure 1:
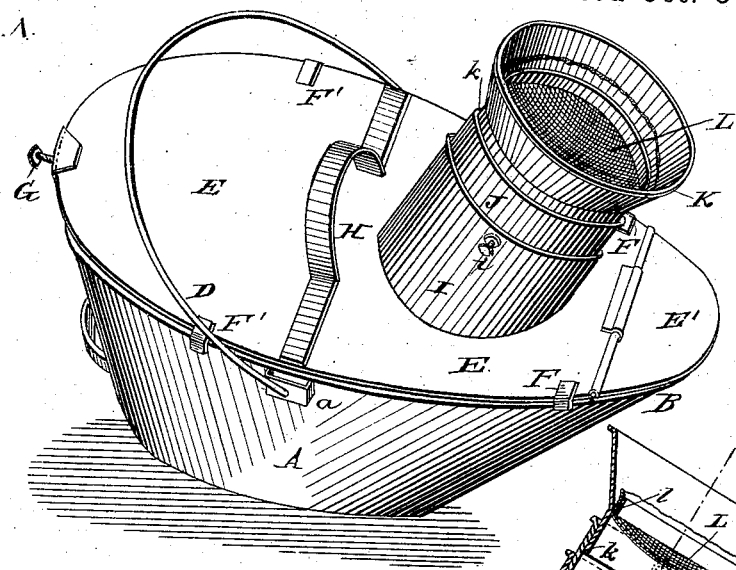
Figure 2:
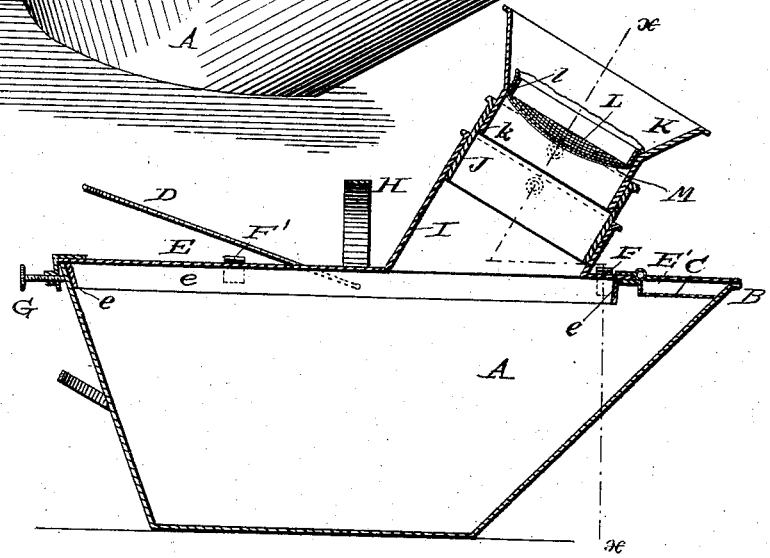
Figure 3:
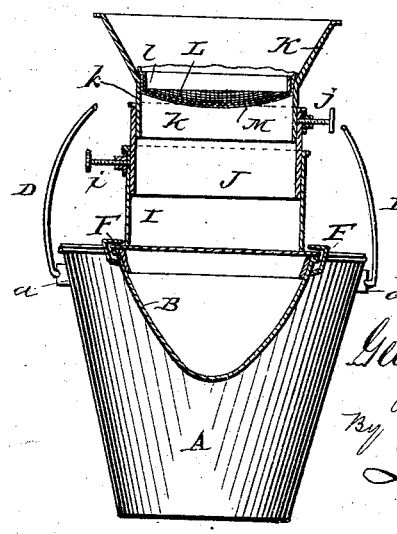

Figure 1 is a perspective view of our improved milk-bucket. Fig. 2 is a longitudinal vertical sectional view of the same, and Fig. 3 is a vertical cross-section on the broken line indicated by *x x* in Fig. 2.

Similar letters of reference indicate corresponding parts in all the figures.

Our invention has relation to milk-buckets, or "milking-buckets," as they are sometimes called, and contemplates an improved construction of the same, as hereinafter more fully described and claimed.

In the accompanying drawings, A denotes the body of the bucket, which is of metal, of a hod shape, with a tapering rounded lip, B, in which is fixed a strainer, C, of wire-cloth or perforated sheet metal. On opposite sides of the body A are ears *a*, adapted to receive a bail, D, for carrying the bucket, the bail being so arranged that the bucket, in carrying, will be evenly balanced when filled or partly filled with milk.

E is the removable cover, which has a flange, *e*, fitting the inside of the bucket closely around its upper rim, back of the fixed strainer C. The latter is covered by a lid, E', hinged to the front part of the flanged cover E, so that it will open of itself when the bucket is emptied of its contents through the strainer. The cover E E' is held in place upon the bucket by catch-lugs F and a binding-screw, G, the inner end of which catches under the beaded rim of the bucket, as clearly shown in Fig. 2 of the drawings. Thus it will be seen that when the screw is tightened up against the body of the bucket it is impossible for the cover to come off, even if the bucket should be accidentally upset. Besides the catch-lugs F, which are fixed to the sides of the bucket and overlap the rim of the cover, the latter is provided with similar catch-lugs, F', which engage the beaded rim of the bucket when the cover is in position. The cover is provided with a handle, H, by which the bucket may readily be picked up and shifted from place to place without making use of the bail D. The front part of the cover, between the handle H and hinged lip or lid E', has a circular opening, into which is soldered an inclined cylindrical sleeve or collar, I, having on one side, near its upper rim, a binding-screw, *i*. Into this collar is fitted a tube, J, open at both ends, and provided near its upper end with a binding-screw, *j*. By means of the binding-screw of collar I the position of tube J within the collar may, it will be seen, be adjusted at any desired height, according to whether large or small animals are being milked. A funnel, K, is inserted into the upper end of tube J and held in place by the binding-screw *j*, and within this funnel, again, is placed a strainer, L, of perforated sheet metal or wire-cloth, the rim *l* of which fits into the lower cylindrical part, *k*, of the funnel. An additional cloth strainer, M, is clamped between the parts *l* and *k*, so that the milk will be thoroughly strained and freed from all impurities before it reaches the bucket, and on pouring it from the bucket into the cans it is a second time strained through the fixed strainer C. In using this bucket the operator is seated on the broad part of the cover back of the handle, straddling the bucket, which brings him in a convenient position for milking. This prevents the bucket from being upset. Neither can it be used, as is too frequently the case with the ordinary milking-stools in common use, as a means for punishing unruly or refractory animals, which are often seriously injured by striking them with the stools in the hands of an impatient milker. The closely-fitting cover prevents the milk in the bucket from becoming contaminated by the odors of the stable, so that it is poured into the can in a perfectly sweet and pure state. The shape of the bucket and its several parts is such that it can be easily cleaned when necessary.

Having thus described our invention, we claim and desire to secure by Letters Patent of the United States—

The improved milk-bucket herein shown and described, consisting of the hod-shaped body A, having fixed strainer C, bail D, and catch-lugs F, cover E, having hinged part E', catch-lugs F', binding-screw G, handle H, and inclined collar I, having binding-screw $i$, tube J, having binding-screw $j$, funnel K, and strainers L and M, the whole constructed and combined substantially as and for the purpose shown and set forth.

In testimony that we claim the foregoing as our own we have hereunto affixed our signatures in the presence of two witnesses.

C. LYON ROGERS.
GEORGE W. WOLF.

Witnesses:
LOUIS BAGGER,
AUGUST PETERSON.